United States Patent
Cotrell et al.

(10) Patent No.: US 8,677,827 B2
(45) Date of Patent: Mar. 25, 2014

(54) WIND TURBINE BLADE TESTING SYSTEM USING BASE EXCITATION

(75) Inventors: Jason Cotrell, Lafayette, CO (US); Robert Thresher, Golden, CO (US); Scott Lambert, Westminster, CO (US); Scott Hughes, Lakewood, CO (US); Jay Johnson, Albuquerque, NM (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 279 days.

(21) Appl. No.: 12/747,487

(22) PCT Filed: Dec. 12, 2008

(86) PCT No.: PCT/US2008/086662
§ 371 (c)(1),
(2), (4) Date: Jun. 10, 2010

(87) PCT Pub. No.: WO2009/097055
PCT Pub. Date: Aug. 6, 2009

(65) Prior Publication Data
US 2010/0275695 A1 Nov. 4, 2010

Related U.S. Application Data

(60) Provisional application No. 61/013,525, filed on Dec. 13, 2007, provisional application No. 61/013,796, filed on Dec. 14, 2007, provisional application No. 61/013,778, filed on Dec. 14, 2007.

(51) Int. Cl.
*G01N 29/12* (2006.01)
(52) U.S. Cl.
USPC .............................. 73/649; 73/663
(58) Field of Classification Search
USPC .................. 73/649, 579, 577, 584, 593, 668; 290/55, 44; 415/4.1, 4.2
See application file for complete search history.

(56) References Cited

U.S. PATENT DOCUMENTS

| 2,127,950 A | 8/1938 | Bennett |
| 3,100,989 A | 8/1963 | Jones |

(Continued)

FOREIGN PATENT DOCUMENTS

| JP | 04164231 | 6/1992 |
| SU | 779846 B | 11/1980 |
| WO | 2004005879 | 1/2004 |

OTHER PUBLICATIONS

New Method forDual-Axis Fatigue testing of large wind turbine blades using resonance excitation and spectral loading, Apr. 2004, Darris White.*

(Continued)

*Primary Examiner* — J M Saint Surin
(74) *Attorney, Agent, or Firm* — W. LaNelle Owens; John C. Stolpa; Paul J. White

(57) ABSTRACT

An apparatus (500) for fatigue testing elongate test articles (404) including wind turbine blades through forced or resonant excitation of the base (406) of the test articles (404). The apparatus (500) includes a testing platform or foundation (402). A blade support (410) is provided for retaining or supporting a base (406) of an elongate test article (404), and the blade support (410) is pivotally mounted on the testing platform (402) with at least two degrees of freedom of motion relative to the testing platform (402). An excitation input assembly (540) is interconnected with the blade support (410) and includes first and second actuators (444, 446, 541) that act to concurrently apply forces or loads to the blade support (410). The actuator forces are cyclically applied in first and second transverse directions. The test article (404) responds to shaking of its base (406) by oscillating in two, transverse directions (505, 507).

19 Claims, 8 Drawing Sheets

(56) References Cited

U.S. PATENT DOCUMENTS

| | | | |
|---|---|---|---|
| 4,389,891 A | 6/1983 | Fournier | |
| 5,974,882 A * | 11/1999 | Heath | 73/579 |
| 6,094,989 A * | 8/2000 | Twerdochlib | 73/659 |
| 6,394,745 B1 * | 5/2002 | Quraeshi | 415/4.1 |
| 7,362,004 B2 * | 4/2008 | Becker | 290/55 |
| 7,946,802 B1 * | 5/2011 | Iskrenovic | 415/4.2 |
| 8,092,182 B2 * | 1/2012 | Radisek | 416/204 R |
| 8,096,773 B2 * | 1/2012 | Chang | 416/169 R |
| 8,100,651 B2 * | 1/2012 | Tsou | 416/55 |
| 8,393,216 B2 | 3/2013 | Guy | |
| 2006/0037402 A1 | 2/2006 | Musial et al. | |
| 2007/0272018 A1 | 11/2007 | Shadman et al. | |
| 2010/0263448 A1 * | 10/2010 | Hughes et al. | 73/577 |
| 2011/0041617 A1 * | 2/2011 | Cotrell et al. | 73/660 |
| 2011/0179884 A1 | 7/2011 | Guy | |
| 2011/0292372 A1 | 12/2011 | Criado Abad et al. | |
| 2012/0020798 A1 | 1/2012 | Barnsley | |
| 2012/0314201 A1 | 12/2012 | Riezu Corpas et al. | |
| 2013/0061683 A1 | 3/2013 | Baker et al. | |
| 2013/0071244 A1 | 3/2013 | Mertens et al. | |
| 2013/0213136 A1 | 8/2013 | Guy | |

OTHER PUBLICATIONS

A general method for fatigue analysis of vertical axis wind turbine blade, Veers, 1983.*
Structural health monitoring of wind turbine blades, Rumsey et al., 2008.*
Intl Search Report dated Aug. 14, 2009, for Intl Application No. PCT/US08/86662.
Written Opinion dated Aug. 14, 2009, for Intl Application No. PCT/US08/86662.
International Preliminary Report on Patentability for International (PCT) Application No. PCT/US09/42537, issued Nov. 2, 2010, pp. 1-5.
International Search Report and Written Opinion for International (PCT) Application No. PCT/US09/42537, mailed Dec. 4, 2009, pp. 1-11.
International Preliminary Report on Patentability for International (PCT) Application No. PCT/US08/86662, issued Jun. 15, 2010, pp. 1-5.

* cited by examiner

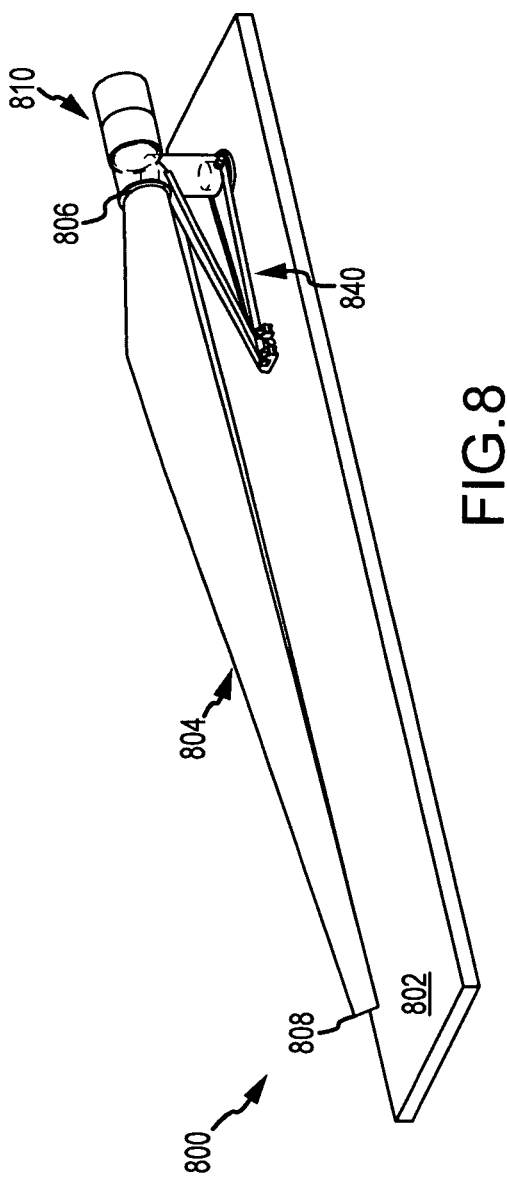
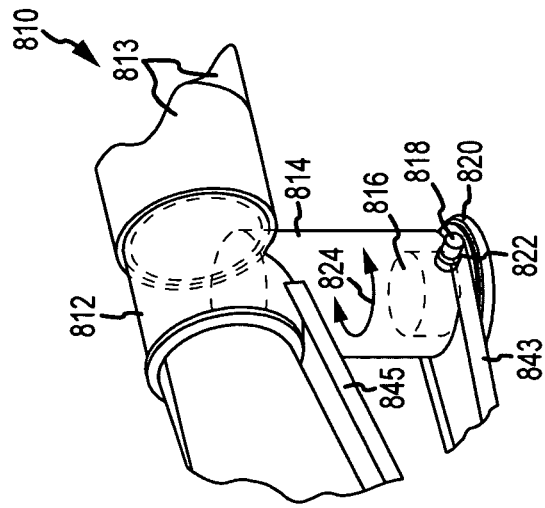
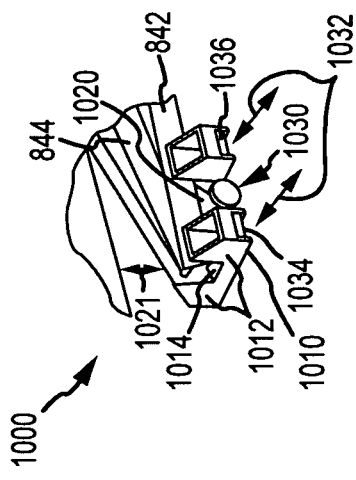
FIG.8
FIG.9
FIG.10

WIND TURBINE BLADE TESTING SYSTEM USING BASE EXCITATION

CROSS-REFERENCE TO RELATED APPLICATIONS

This application claims the benefit of: U.S. Provisional Application No. 61/013,525, filed on Dec. 13, 2007; U.S. Provisional Application No. 61/013,778, filed Dec. 14, 2007; and U.S. Provisional Application No. 61/013,796, filed Dec. 14, 2007, which are incorporated herein by reference in their entireties.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Recently, there has been a rapidly growing demand for renewable energy including wind energy. To meet this demand, wind turbine designers are working to provide blade designs that allow a turbine connected to the wind turbine blades or to the rotor to effectively convert wind into electricity. The blades must also be designed properly to withstand inertial forces, aerodynamic forces, and structural forces so as to provide a relatively long service life and safe operation. Like all rotating machines, wind turbines are generators of fatigue, and every revolution of its components including the turbine blades produces a load or fatigue cycle, with each of these cycles causing a small, finite amount of damage that eventually may lead to fatigue cracks or other failures.

Modeling may be used in some cases to determine service life of a turbine blade during normal operations. However, modeling has its limitations including variations in the as-built/manufacture blade and a design and the difficulty in accurately modeling operational conditions with varying and sometimes random loading. As a result, wind turbine blades are typically laboratory tested to determine that their fatigue strength or characteristics are adequate for a desired service life. Wind turbine or rotor blade testing is used to verify that laminations in the blade are safe (e.g., the layers used to fabricate a blade do not separate (i.e., delamination)) and to verify that the blade will not break under repeated stress.

Presently, wind turbine blades are fatigue tested in the flapwise direction (i.e., out of the rotor plane or in a direction transverse to a plane extending through the blade) and in the edgewise direction (i.e., in the plane of rotation or in a direction parallel to a plane extending through the blade). For large blades (e.g., greater than forty-meter blade lengths), these two fatigue tests (e.g., two single axis tests) are typically run sequentially, and, to simulate a typical service life of a blade, each test may involve placing a blade through one million to ten million or more load or fatigue cycles, which may take three to twelve months or more to complete for each tested direction. There is a trend for wind generator systems to become increasingly larger. Unfortunately, however, the larger blades associated with larger wind generator systems are subjected to greater static and dynamic loads and the facilities for testingtest these larger blades are also very large as newer generation turbine generators being designed with blades 40 meters or more in length. It is very desirable, and often necessary, to advance test a proposed blade design to ensure that it will be capable of withstanding the expected loads without structural failure and to evaluate the fatigue resistance of the blade design, and these advanced tests may significantly delay implementation of a new blade design. The test equipment can also be relatively expensive to purchase and operate, which can drive up the costs of blades and wind energy. Hence, there is a need for blade testing techniques that are less expensive to use and take less time to complete while still providing accurate fatigue testing results.

As further background on laboratory testing, wind turbine blades are tested by applying loads to the blade in various directions. For example, one type of load is applied in a direction perpendicular to the longitudinal or long axis of the blade and is often referred to as a bending load or as a flap load in the wind turbine field. Another type of load is also applied in a direction perpendicular to the longitudinal axis but also perpendicular to the direction of the applied bending or flap load in order to assess the structural properties of the blade in the transverse or rotational direction. Such loads are often referred to as transverse or lead-lag loads. The load applied to the blade in a given direction may be time-invariant or "static." Alternatively, the load may be made to vary with time in which case the load is often referred to as "cyclic." Static loads are generally useful in evaluating the stiffness and ultimate strength of the blade whereas cyclic loads are generally useful in evaluating the fatigue resistance of the blade.

Several different types of test systems have been developed and are being used to apply loads to wind turbine blades. One type of test system uses a linear hydraulic actuator to apply the desired loads to the blade. The base or root of the blade is mounted to a rigid and very large test stand and the linear hydraulic actuator is mounted to the blade some distance from the root or base and from the test stand. This type of apparatus is advantageous in that it can be used to apply loads in any desired direction by simply mounting the hydraulic actuators at the desired positions on the blade and by orienting the actuators in the appropriate directions, e.g., for sequential flapwise and edgewise testing. However, these systems often use a large actuator, and a relatively complex hydraulic system with pumps and hoses to operate the actuator to oscillate the blade or test article. The size of the test stand with its large concrete blocks and the complexity and size of the hydraulic actuator make these testing systems difficult to move and time consuming and expensive to build and set up, which limits the number of such test systems and forces blade manufacturers to ship blades to the testing facilities for fatigue testing.

More recently, a resonance test system has been designed (and used) that provides an actuator for applying loads in the flapwise direction at or near the resonant or natural frequency of the test system in the flapwise direction. The loading apparatus is attached directly or through compliant linkages to the blade (e.g., at a location some distance from the blade base or root such as one third or more along the length of the blade). A transverse load, in some cases, is applied (e.g., a load in the edgewise direction) to the edge of the blade to load the blade in the edgewise direction at the same time as it is loaded in the flapwise direction to better simulate actual operating loads and hasten testing. For example, the transverse load has typically been applied with a forced displacement device with a bell crank or similar device that is attached to the ground plane to provide oscillation in the edgewise or transverse direction. The oscillation in the transverse direction is typically provided at the same frequency used for the actuator applying a flapwise load (e.g., both loads are input at or near the resonant frequency of the test system in the flapwise direction), and the design of the forced displacement device has limited capability due to the large oil flow, if utilizing hydraulic systems, and displacement needs. As a result, such fatigue testing systems are possible but may be limited by practical constraints for larger blades (e.g., blades over forty 40 meters) in which flapwise displacement may be quite large such as up to 6 meters or more. Again, blade excitation is imparted at locations spaced apart from the blade base or root.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

Briefly, multi-axis degree of freedom blade testing systems are described that effectively utilize base excitation (e.g., shaking or oscillating a base or root) to provide more efficient fatigue testing of wind turbine blades. During operation, the system provides a testing method that provides simultaneous displacements of a test article such as a blade in multiple degrees-of-freedom (e.g., translations and/or rotations) by concurrently moving or shaking a blade support structure in two or more directions.

More particularly, an apparatus or system is provided for fatigue testing elongate test articles including wind turbine blades through forced or resonant excitation of the base of the test articles. The apparatus includes a testing platform or foundation. A blade support is provided for retaining or supporting a base of an elongate test article, and the blade support is pivotally mounted on the testing platform with at least two degrees of freedom of motion relative to the testing platform. An excitation input assembly is interconnected with the blade support, and this assembly includes first and second actuators that act to concurrently apply forces or loads to the blade support (directly or via an intermediate element such as a leverage arm/frame). The actuator forces or loads are typically applied in first and second directions and at first and second frequencies (e.g., differing frequencies that may or may not correspond to resonant frequencies of the test article in particle oscillating directions such as flapwise and edgewise directions for a blade). The first direction and second direction are transverse and may be orthogonal in some cases, and the test article responds to its base being moved with the blade support by oscillating in two, transverse directions.

In some embodiments, the blade support includes a hub pivotally mounted to the testing platform that receives the base of the test article. The excitation input assembly may include a leverage arm or frame that extends from the hub, and the first actuator may apply forces to the leverage arm (e.g., at or toward a tip of the arm) in a direction that is substantially parallel to a longitudinal axis of the test article, which causes the test article to oscillate in the vertical direction. The hub may also be mounted to the platform for translational or sliding movement in the second direction (e.g., in a plane parallel to the testing platform or the like), and the second actuator may be a linear actuator that applies forces to the blade support proximate to the pivot axis of the hub (e.g., along an axis of a shaft/pin extending out from the hub and pivotally supported by a frame that is, in turn, attached to the testing platform).

In other embodiments, the blade support includes a hub mounted to the testing platform for rotation about two, transverse axes. The base of the blade or other test article is attached to the hub. The excitation input assembly may include a leverage arm that extends from the blade support, and the first and second actuators may apply the first and second direction forces to the leverage arm (e.g., at a tip or other location spaced apart from the hub) such that the leverage arm transmits the applied forces to the blade support. The hub is then rotated about the two transverse axes, which causes the base of the blade/test article to oscillate and the blade/test article oscillates in two, transverse directions (e.g., flapwise and edgewise directions). The excitation input assembly may include a trolley with a channel receiving the leverage arm near to where the forces are applied to the leverage arm and adapted for supporting the first actuator. The trolley includes rollers or similar devices for rolling on the upper surface of the testing platform, with the second actuator being mounted on the test platform and in abutting contact with the trolley or the leverage arm to apply the forces in the second direction (e.g., to cause the trolley to roll in an arcuate path on the platform and cause the leverage arm to rotate the hub about a vertical axis).

In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

FIG. 1 illustrates in schematic and/or functional block form a base excitation test system for use in load and/or fatigue testing a test article or specimen such as a blade for a wind turbine, with the test system being adapted to act on the base or root of the blade to impart oscillating or excitation forcing loads or functions in one, two, three, and/or more directions or degrees of freedom separately or concurrently (e.g., actuation in the flap direction, actuation in the edge direct, pitch actuation, and so on) on the test article or blade.

FIG. 8 is an isometric view of another embodiment of a dual-axis fatigue testing system.

FIGS. 9 and 10 are detailed isometric views of the testing system of FIG. 8 illustrating support and excitation input details or features.

DESCRIPTION

Figure 1:
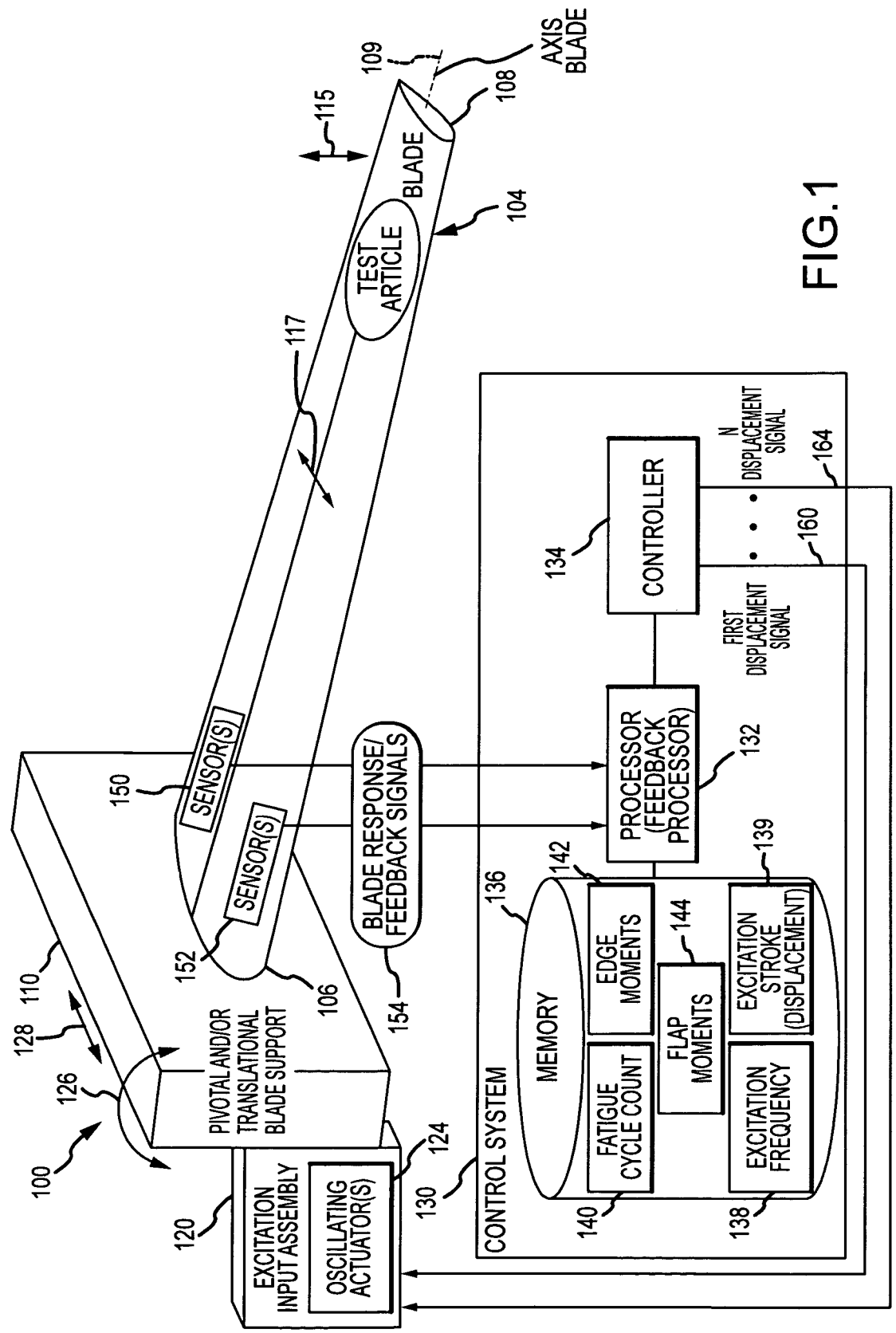

The following provides a description of exemplary methods and systems for fatigue testing wind turbine blades through use of base or root excitation. Generally, embodiments described herein use a variety of techniques to shake or excite a blade support (e.g., a test stand) so as to cause a test article such as wind turbine blade to oscillate in one or more directions or in one or more degrees of freedom. For example, a blade may be mounted to a blade support, and the blade support may be oscillated in a first direction (e.g., in the flapwise, or out of the rotor plane direction) and concurrently oscillated in a second direction (e.g., in the edgewise, or in the rotor plane direction). In prior blade testing, fatigue in these two directions or axes of the blade was typically performed independently by applying loads and/or forcing functions to the blade at a location spaced apart from the base (such as at the midpoint of the blade length or the like). The methods and systems described herein for performing both tests simultaneously significantly reduce the time for blade fatigue testing, which increases throughput of a test facility. Additionally, the testing system may be mobile to allow it to be taken to a manufacturing facility rather than shipping the large blades significant distances.

Briefly, the blade support (or test stand) is not rigidly mounted to the ground or a test platform but is, instead, mounted such that it may pivot or translate in one or more directions (e.g., about or in one or more points or axes). An excitation input assembly is provided to provide the forcing functions or oscillating inputs to move the platform, and a base of an attached blade or test article, in one or more directions (e.g., to shake the base to oscillate the blade). The excitation input assembly includes one or more oscillating systems or actuators that provide the single or multi-axis excitation. These actuators typically are linked or placed in abutting contact with a driving member/assembly that, in turn, is attached to or placed in contact with the blade support. In operation, the actuators cause the driving member/assembly (or a portion thereof) to be displaced a particular amount or distance, which causes the blade support to move in one or more directions. As a result, the base or root of the turbine blade moves in one or more directions, which causes the blade to oscillate allowing fatigue testing in one or more directions (e.g., in a flap wise direction, in an edge wise direction, in pitch, and so on).

The response of the system is determined by or is relative to the system inputs. Blades under loading will deform about a complex axis due to typical design and construction attributes. The input loading is typically referred to as flap and edge, but the response will be a combination of these directions and others (e.g., torsion). In the following description it should be understood that the direction of the response is roughly aligned with the input loading, but it will deviate from any 'exact' local or global coordinate system. Hence, the terms flapwise and edgewise oscillation in a blade due to similar inputs should be considered at least somewhat of an approximation (e.g., two input sets of excitation forces may be generally orthogonal (e.g., transverse and in planes that are about 90 degrees apart (e.g., 70 to 110 degrees or the like) and the direction of the response in the blade may be substantially/generally orthogonal, too (e.g., in the edgewise and flapwise directions or the like)) and/or their may be other components such as twist-coupling phenomena (e.g., torsional movements of the blade) due to concurrent excitation forces in differing directions.

A number of oscillating systems may be used to provide the base excitation of the test article or wind turbine blade (with "blade" being used from hereon for ease of explanation). In other words, the term "actuator" is intended to include nearly any device that may be used to provide displacement at a particular frequency or rate such as a hydraulic or other linear or rotary actuator, an electric motor, and so on. Generally, the oscillating systems may include one or more actuators or other devices for imparting forcing functions in one, two, or more degrees of freedom or directions in a controlled manner (e.g., at the edge and/or flap resonant frequencies of the test system). For example, the oscillating system may provide a first linear or rotary actuator to cause the driving member/assembly to move in a first direction (e.g., vertically to cause the base to move and oscillate the blade in the flapwise direction) and a second linear or rotary actuator to cause the driving member/assembly to move in a second direction (e.g., horizontally to cause the base to move and oscillate the blade in the edgewise direction). The actuators of the excitation input assembly may be operated by a control system with displacement signals provided at natural or other frequencies (e.g., constant amplitude sinusoidal displacement signals at the same or more typically at differing amplitudes to simulate in-use or a predefined loading condition).

FIG. 1 illustrates schematically a wind turbine blade testing system of one embodiment adapted to perform fatigue testing of a wind turbine blade 104 using base excitation. For example, the system 100 may be used to provide concurrent fatigue testing in one, two, three or more axes or degrees of freedom (e.g., concurrent or sequential testing in the flapwise and edgewise directions). The system 100 includes a test stand or blade support 110 for retaining a test article such as blade 104 in a cantilevered arrangement with the base or root end 106 of the blade 104 rigidly or semi-rigidly affixed to the blade support 110 and the blade 104 extending outward with its tip end 108 being unrestrained along its length or along the longitudinal axis, $axis_{blade}$. The blade 104 may be nearly any blade design with the test system 100 being particularly well suited for use with larger blades such as those in use in 1.5 Megawatt and larger wind turbines, e.g., forty 40 meter and larger blades being typical. The larger blades are more easily tested with the system 100 because edgewise testing is performed with an excitation input assembly 120 that is not mounted to the body of the blade 104 along its span or length but instead in contact with the blade support or test stand 110, which allows the system to handle large blade displacements (e.g., up to six meters or more with some larger blades that are oscillated at or near the flap resonance). The system is well suited for testing blades with large sensitivities to transverse displacements or rotations such as bend-twist coupled blades as the method is not restricted by geometric load effects from ground-plane referenced forcing loads.

The system 100 includes an excitation input assembly 120 for providing forcing functions or to cause displacement at selectable frequencies in one, two, or more directions (e.g., multi-axis inputs such as in the flapwise, edgewise, and pitch directions of the blade 104). The oscillating assembly 120 may take a number of forms to provide the forcing functions or oscillating inputs. For example, one or more oscillating actuators 124 may be provided to excite the blade support 110 to excite the base 106 of the blade 104 in a first direction, e.g., in the flapwise direction (e.g., transverse or orthogonal to a plane extending generally between the leading and trailing edge of the blade 104 and containing the longitudinal blade axis 109 or out of plane). In some cases, the actuator 124 may be also adapted to oscillate the blade support 110 to excite the base 106 of blade 104 in a second direction, e.g., the edgewise direction (e.g., in a direction transverse to the blade axis 109 or in the blade plane). The excitation input assembly 120 typically includes a drive assembly (not shown in FIG. 1) that is in contact with the blade support 110 (such as to a vertical face or surface of the support 110 or to a base/mounting structure of the support 110) and operation of the actuators 124 applies an oscillating force or load upon the blade support 110 causing it to move in one or more directions. Movement of the blade support 110 is shown with arrows 126, 128 with arrow 126 representing movement of the blade support 110 about a first axis and arrow 128 representing movement of the blade support 110 about a second axis (e.g., to cause the blade 104 to oscillate with two degrees of freedom such as generally in a flapwise direction and generally in an edgewise direction). The application of force by the actuators 124 typically will be lines or directions that are transverse and, in some cases, planes containing such forcing functions are orthogonal, although this is not required.

The actuators 124 are operated by a control system 130 to excite the base 106 of the blade 104 to move or oscillate as shown at 115 in a first direction (e.g., the flapwise direction by applying forces out of the rotor plane (e.g., orthogonal to the blade plane) and at or near the flap natural frequency of the test system 104). Concurrently (or during the same operating or test period), the actuators 124 are operated by the control system 130 to excite the base 106 of the blade to move or oscillate as shown at 117 in a second direction (e.g., the edgewise direction by applying forces in the rotor plane (e.g., parallel to or coplanar with the blade plane) and at or near the edge natural frequency of the test system 104). Typically, the flap and edge resonant frequencies differ such that edge and flap forcing functions use two differing frequencies, but, in some embodiments, these two frequencies may be substantially the same. The actuators 124 may be hydraulic or other types of actuators such as electric motors to provide the desired oscillations 115, 117.

The control system 130 includes a processor or feedback processor 132 running a controller or control module (e.g., a PID controller or the like) 134. Memory 136 is provided that stores test parameters and measured and/or determined test data. This stored data may include excitation frequencies for base excitation in one or more directions 138 and excitation strokes or displacements 139 with these values being used by controller 134 for use in timing the transmittal of corresponding displacement signals 160-164 to the oscillating assembly 120 to operate the actuators 124 (e.g., displacement signals to a flapwise actuator and to an edgewise actuator). The stored data may also include a tabulation or count of the number of load or fatigue cycles 140 that is imparted during operation of the system 100 to fatigue test the blade 104. Yet further, the stored data may include loads or moments for the edge and flap 142, 144 such as may be measured by sensors 150, 152, such as strain gauges or as may be determined based on calibrations of accelerometers or other transducers. Although not shown, the control system 130 may further include software for displaying or outputting the data in memory 136 such as in table or graph form and for performing desired calculations such as determining moments 142, 144 from accelerometer output signals (e.g., signals 154 or the like).

Sensors 150, 152 are provided on the flap and edge portions of the blade 104 and output blade response/feedback signals 154 that are processed by the feedback processor 132 for use in operating controller 134 to transmit displacement signals 160-164 to operate the actuators 124 of excitation input assembly 120 to maintain the loads applied to the blade 104 within a predefined test or load envelope (e.g., within predefined maximum loads/blade bending moments) and/or to maintain displacements of the blade 104 within a desired displacement envelope (e.g., within predefined maximum flapwise and edgewise displacements). For example, the signals 160-164 may have amplitudes that are set by the controller 134 in response to determinations by the processor 132 of the moments experienced by the blade in the edgewise and flapwise directions based on feedback signals 154 from sensors 150, 152. The signals 160-164 may be transmitted at the excitation frequencies 138 in phase or more typically with a variable phase offset (e.g., such as a 90 degree lag between the first direction displacement signal 160 and the second (or additional) direction displacement signal 164).

As will become clear, test or testing systems may be implemented to achieve a variety of goals. For example, some embodiments described herein address the desire to eliminate the need for specialized hydraulic equipment including pumps, hoses, and actuators while providing a test system that acts oscillate a test article (e.g., wind turbine blade) in one or more directions. In some cases, the test system is mobile, and some embodiments may be thought of as directed toward a mobile oscillatory fatigue operator (MOFO) test system and associated testing methods. Exemplary MOFO test systems may use a motor or other actuator(s) to resonate a blade by oscillating the blade at its root or base, such as by "shaking the base" by applying an excitation displacement at a particular frequency to a blade support (or "reaction structure") upon which the root or base of the blade is mounted.

For example, the blade support may be pivotally mounted at its base such that the attached blade may be vertically displaced a particular displacement or through a stroke length at a test or driving frequency (e.g., near the blade's resonant frequency or the like) so as to resonate the blade in either a first or second direction (e.g., in either the flapwise or edgewise direction). The actuator (e.g., an electric motor) may include a flywheel system to rotate a link that is attached to a drive member or frame of an excitation input assembly, such as with a prismatic joint or the like, at a point spaced apart or distal to the blade support (e.g., a tip of the drive member or frame). The other end of the drive member or frame is connected to the blade support. During operation of the actuator, the drive member or frame's vertical deflection causes the member to rotate at its connection point to the actuator about a revolute joint or other mounting arrangement mounted to a test platform (or the ground). As the drive member or frame has its tip or end moved up and down, the portion of the drive member or frame attached to the blade platform applies a forcing function or excitation force/load to the blade platform that causes the blade to move or pivot back and forth about its base and shake the root or base of the attached blade.

Figure 2:
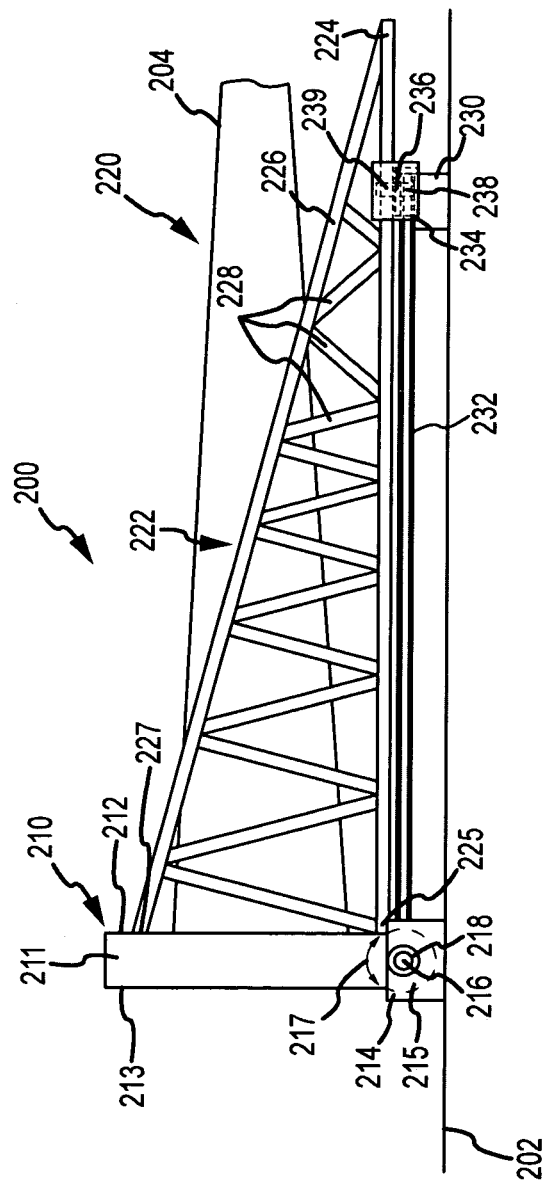
FIG. 2 is a side view of a blade test system adapted for oscillating a wind turbine blade via base excitation.

FIG. 2 illustrates a fatigue testing system 200 of one embodiment useful for single axis (or single degree of freedom) testing of an elongate test article such as a wind turbine blade 204. Generally, the system 200 includes a pivotal base support assembly 210 and an excitation input assembly 220 for shaking or exciting the support assembly to oscillate the wind turbine blade 204 (e.g., oscillate the blade 204 in the flapwise direction). The base support assembly 210 includes a body or reaction structure 211 that is pivotally supported along its base or lower edge 215 by a mounting member 214. Mounting member 214, in turn, is rigidly attached to the ground or a test platform 202 (e.g., a concrete pad or the like). The pivotal mounting may be achieved in a number of ways such as through the use of a rod or shaft 216 extending through (or out of the sides) of the reaction structure 211 that is supported at each end within the mounting member via bearings 218. The mounting member 214 may include two blocks (e.g., right and left ground mounts) to support the reaction structure 211 at each side, with each block including a bearing (or bearing assembly) 218 for receiving ends of the shaft 216. When a driving or excitation force or load is periodically applied to a mounting face 212 of the reaction structure 211 by excitation input assembly 220, the reaction structure pivots as shown at 217 about the shaft 216 in bearings 218.

The excitation input assembly 220 a drive frame or truss 222 that is shown arranged as a right triangle with a first or base drive element 224 and a second or upper drive element 226. The first and second drive elements 224, 226 are attached to the mounting face or surface 212 of the reaction structure 211 at ends 225, 227 and attached to each other at the other end. The drive elements 224, 226 are also structurally linked or interconnected via truss or joist members 228. An actuator mounting frame (or plate) 232 provides vertical support for an actuator (e.g., an electric motor or the like) 234 and to the drive frame 222. The actuator mounting frame 232 is attached at one end to the mounting member 214 and at the other end to a second mounting member 230, which is attached to the test platform or ground 202. The actuator 234 is position upon the actuator mounting frame 232 and linked to a pivot arm or bar 239, such as via a flywheel that when rotated causes the pivot arm or bar 239 to travel generally in a circular motion. The pivot arm or bar 239, in turn, is connected to a linkage or force transmission arm 236, and the transmission arm 236 is pivotally attached at 238 to the actuator mounting frame 232 and slidably attached at the other end to the base element 224 of the drive frame 222. Of course, other actuators may be used to vertically displace the frame 222 toward the end distal to the blade support 210, with the arrangement shown only intended as one useful example. In practice, two frames 222 may be utilized with one mounted on each side of the blade 204 so as to better distribute excitation input loads/forces, and, in such cases, the pivot arm or rod 239 may extend between the base members 224 to allow a single actuator 234 to be used (or two actuators may be used to drive the two frames 222).

During use of the system 200, a test article such as a blade 204 is mounted with its base or root rigidly attached to mounting face 212 of the reaction structure 211 (e.g., via an adapter plate or the like selected for the particular blade configuration and its mounting configuration). Operation of the actuator 234 (e.g., a drive motor driven by a controller as shown in FIG. 1) causes the end or tip of the frame 222 to be raised and lowered relative to the platform 202, and this cyclical vertical displacement causes the reaction structure 211 to pivot as shown at 217 about its base 215 and mounting point (e.g., shaft 216). Movement or excitation of the reaction structure 211, in turn, causes the blade 204 to be oscillated generally in the vertical direction (e.g., in the flapwise direction in the illustrated arrangement).

Figure 3:
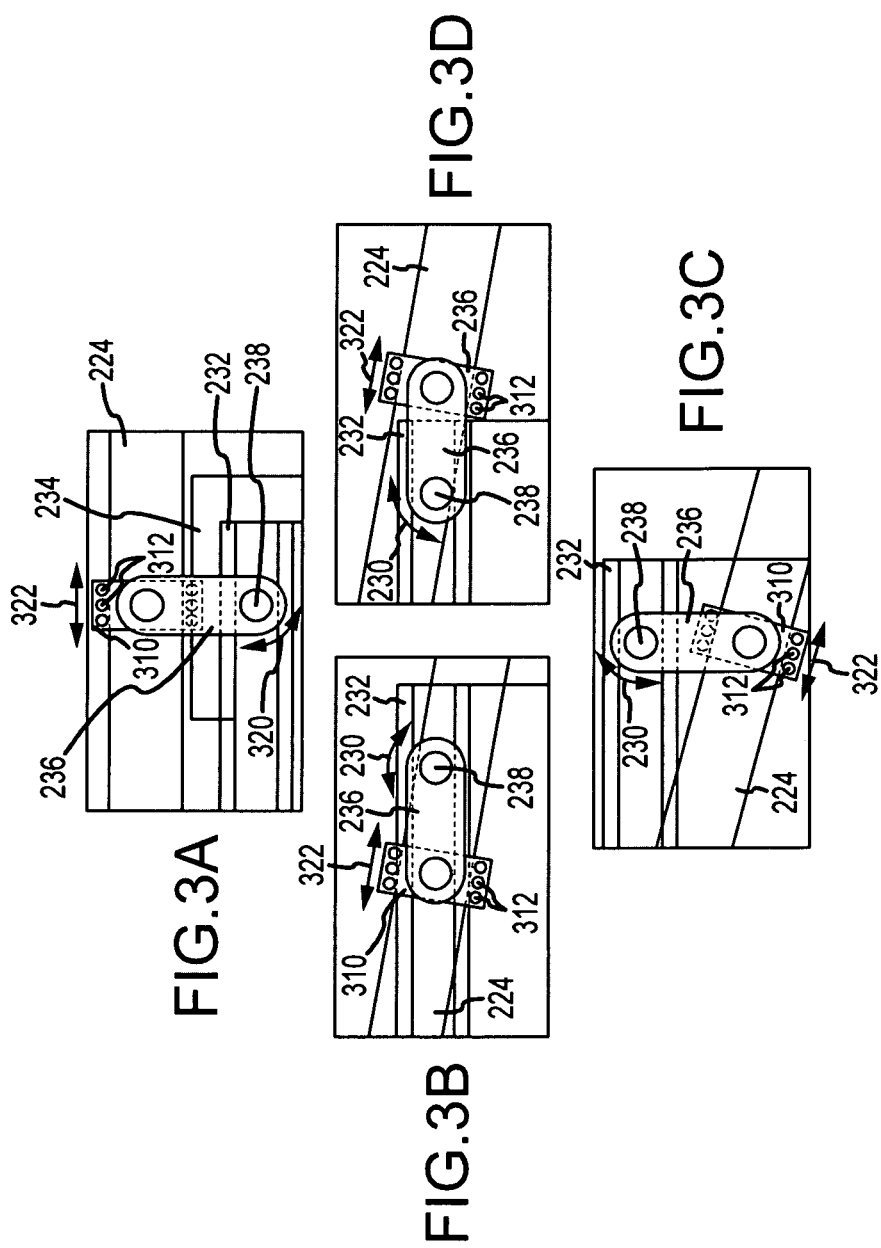
FIGS. 3A-3D illustrate detailed views of a linkage arrangement of the test system of FIG. 2 that is useful for connecting an actuator (e.g., a motor) to a drive frame or assembly.

FIGS. 3A-3D illustrate in more detail operation of the excitation input assembly 220 to input a vertical forcing function to cause the base or root of the blade 204 to oscillate in one direction (e.g., in the flapwise direction at or near the resonant frequency of the system). FIG. 3A shows the input assembly 220 in a starting or at rest position with the vertical linkage or force transmission arm 236 in a vertical position. As shown, the arm 236 is pivotally mounted at one end via pin 238 to actuator mounting frame 232. The arm 236 may be mounted at the other end using a linear or prismatic joint (e.g., a sliding joint with the axis of the joint coincident with the center line of the sliding link 310). To this end, the pivot arm or rod 239 is shown to be attached to the transmission arm 236 and also to follower carriage 310 that is fitted over or upon the base frame 224 so it may slide linearly along the frame element 224 as the linkage or transmission arm 236 rotates with movement of the pivot arm or rod 239. Bearing(s) 312 may be provided to facilitate movement of the follower carriage 310 upon the surfaces of the base element 224 of frame 222 as the actuator 234 moves the pivot arm 239 (e.g., an electric motor causes a flywheel attached to the pivot arm 239 to rotate or another actuation technique is applied to cause displacement of the arm 239).

FIG. 3B shows the input assembly 220 in a second position in which the pivot arm or rod 239 is rotated counterclockwise about ninety degrees from its first or at rest position. This movement of the arm 239 causes the transmission arm 236 to pivot 320 about pin 238 on motor mounting frame 232. It also causes the follower carriage 310 to slide linearly along the base element 224 of frame 222 while it pulls the frame 222 downward to a second "lower" vertical position. The movement of the frame 222 (or its end distal to blade support 210) causes forces to be applied to the mounting face 212 (e.g., near its top at mounting location of upper element 226 of frame 222) and reaction structure 211 that make the reaction structure 211 pivot 217 a distance away from frame 222. Oscillating or excitation input continues in FIG. 3C with the pivot arm 239 being moved to a bottom vertical position placing the transmission arm 236 in a second vertical position with the follower carriage 310 below the actuator mounting frame 232. In this position, the frame 222 may be applying no force upon the reaction structure 211 or a tensile force pulling the structure 211 back toward its original position.

In FIG. 3D, the pivot arm 239 is moved by the actuator 234 further in the counterclockwise direction (e.g., into a horizontal plane with the pivot pin 238), which may cause the frame 222 to apply a tensile force upon the mounting face 212 of the reaction structure 211 causing it to pivot 217 toward the frame 222. In FIG. 3A, the oscillation input cycle is completed with the frame 222 (and base element 224) as well as linkage or transmission arm 236 returned to the at rest position. During the movement of the frame 222 and interconnected reaction structure as shown in FIGS. 3A-3D, the attached blade 204 is also moved first up and second downward (or through a vertical displacement or through one excitation stroke). By repeating the movements shown in FIGS. 3A-3D, the base of the blade 204 is excited and the blade 204 oscillates to allow fatigue testing, e.g., fatigue testing in one direction at the input or operating frequency of the actuator 234.

The testing system 200 provides a number of advantages and features. The use of two input drive assemblies or frames 222 with the blade support assembly 210 provides a support stand for the blade 204. In some cases, the structure 211 may be relatively small and lightweight compared with existing test stands, without large concrete blocks or weights (although counterweights may be used in some cases to counterbalance the weight of the blade 204 to reduce loads at the follower carriage 310 such as by mounting or attaching on face 213 of the structure 211). In other cases, the system 200 may be used to concurrently test two blades 204 by mounting a second blade of similar configuration on the face 213 (such as on an adapter plate provided on the structure 211). The frame 222 and blade support 210 may be adapted to provide proper support and balancing with only a single pair of frames 222 adjacent one of the two blades, and only one actuator (or actuator assembly with 1, 2, or more actuators) 234 may be used to excite or shake the base to oscillate the two attached blades 204. The frame 222 may be formed of steel or other metallic materials and be sized and/or shaped to provide a better stand or support for the blade 204. In one embodiment, for example, the frame 222 is sized such that the center of gravity of the blade 204 coincides with about the end of the base member 224 or tip of the frame 222 (where elements 224 and 226 are dmate), e.g., the length of the base element may be about sixteen to twenty meters for a forty meter blade.

The base elements 224 are elongate and selected to have a length between the surface 212 of reaction structure 211 and excitation input location (e.g., position of pivot arm 239 attachment) that provides a desired amount of leverage such that less force has to be provided by the motor or actuator 234 to pivot 217 the reaction structure 211 and supported blade 204 (e.g., to excite or shake the blade base or root). The testing system 200 also is relatively mobile and may be loaded upon a truck for transfer to blade manufacturing facilities and other blade locations, as the system 200 and its frame 222 (which may be considered a mobile fatigue testing stand) is self supporting in some embodiments with little anchoring to ground or a test platform (which may be a truck bed in some cases). In some embodiments, it may be desirable for the test system 200 to be adapted for variable amplitude testing, and this may be achieved by changing out the linkage or transmission arm 236 to provide a different displacement or stroke (or range of pivoting 217 of the structure 211). In other cases, variable amplitude testing is supported with a variable length link 236 (e.g., a link or arm that may have a length adjustable via a linear or other actuation device). A controller (such as controller of system 100 of FIG. 1) may be used to change the speed (or frequency) of the excitation (e.g., by changing the operational frequency of the actuator 234).

The system 200 may be used for fatigue testing in any single direction such as flapwise, edgewise, pitch, or other direction by adjusting the mounting orientation of the blade 204. Additionally, the system 200 may be used in conjunction with other excitation devices to provide dual or multi-axis resonance or fatigue testing, such as by mounting an excitation device upon the blade 204 to provide excitation or oscillation in a direction that differs from the direction of oscillation provided by system 200 (e.g., the system 200 may cause blade 200 to oscillate in the flapwise direction and an additional excitation device may be used to impart edgewise oscillation of the blade 204).

Figure 4:
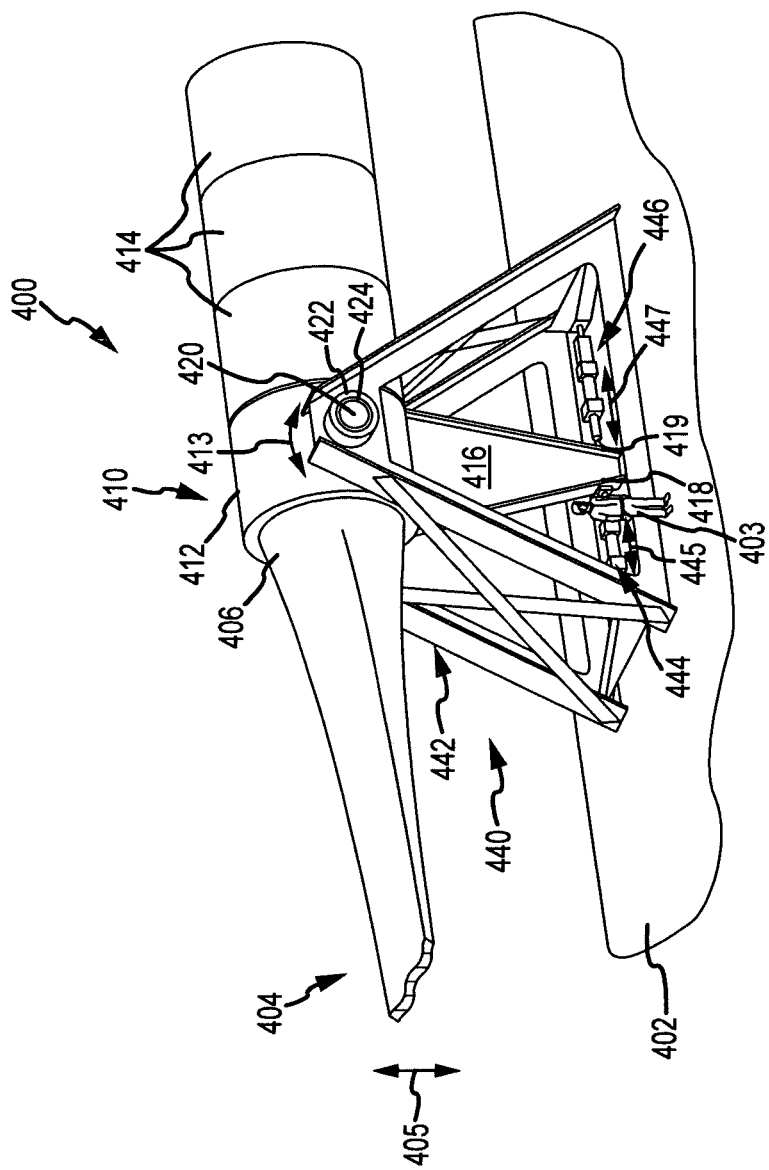
FIG. 4 illustrates an isometric view of another embodiment of a blade fatigue testing system illustrating an alternative blade support arrangement and excitation input assembly.

FIG. 4 illustrates another embodiment of a blade testing system 400 adapted for more efficient fatigue testing of wind turbine blades 404 (e.g., in a flapwise direction as shown or in other directions). The system 400 represents a more compact design relative to system 200 as the blade support assembly 410 and excitation input assembly 440 are both positioned proximate to the position of the blade root or base 406. Further, the excitation input assembly 440 is adapted to position the blade 404 at a height that avoids interference with the ground or a test platform 402. Additionally, the system 400 more readily supports testing of two blades 404 as the counter weights 424 may readily be replaced with a second blade (e.g., a blade of similar design as blade 404).

As shown, the excitation input assembly 440 includes a structural or base frame 442 that is attached or mounted to a test platform or the ground 402. The specific design of base frame 442 is not limiting, but the base frame design may be chosen to properly elevate the blade base 406 to account for blade displacement (with height of the base typically being several to ten or more meters as represented by height of test observer 403) and to also support the weight of the blade and cantilevered forces during testing. The base frame 442 physically supports the blade support assembly 410 such that it can pivot about the mounting axis (e.g., an axis of extending shafts or pins 420).

The blade support assembly 410 includes a hub 412 that is pivotally 413 mounted to the base frame 442, such as via pins/shafts 420 extending outward from each side of the hub 412. The hub 412 is configured for mounting of at least one blade 404 on one end (e.g., with an adapter plate provided within or on hub 412), with the blade base or root 406 being affixed to the hub 412, and, typically, the longitudinal axis of the blade 404 will extend transverse and/or substantially orthogonal to the pivot axis of the hub 412 (e.g., the axis of the shafts/pins 420). The blade 404 is cantilevered from the hub 412 such that when the hub 412 is pivoted or excited the blade 404 oscillates as shown at 405 in one direction (e.g., in the flapwise direction as shown or another direction depending on the mounting of the blade 404).

The hub 412 (and attached blades 404 and weights 414) are supported upon collar 422, which may be an integral portion of frame 442 or an added element, and the collar 422 includes bearings 424 to facilitate rotation or pivoting 413 of the hub 412 during use of system 400. The bearing design is not limiting and may take a number of forms such as a sleeve or shaft bearing (e.g., a solid Teflon® tube or the like). The hub 412 is also adapted for supporting a second blade opposite the first blade 404 or, alternatively, a set of counterweights 414 to counter balance the weight of the blade 404. In one embodiment, for example, the counterweights 414 may be weighted (e.g., concrete-filled) pipes that are chosen to match the blade weight, cantilevered forces, and forces developed during tests (e.g., a seventy meter blade may weigh 40,000 kg and the weights 414 may be three concrete-filled pipes weighing 50,000 kg each).

To facilitate oscillating of the hub 412 and the base 406 of blade 404, the blade support assembly 410 includes a fin (or reaction structure/element) 416 that extends outward from hub 412. The fin 416 may be planar member with sidewalls 418, 419 for receiving input or excitation forces, and the fin 416 may be generally planar as shown with a frustoconical or other shape. The fin 416 is arranged such that application of forces as shown at 445, 447 cause it to transmit forces to the hub 412 causing it to pivot 413 about pin/shafts 420 (e.g., a plane extending through the fin 416 is transverse to the axis of the pins/shafts 420 and may be parallel to or coincident with longitudinal axis of blade 404). The fin 416 in the embodiment 400 extends downward into the base frame 442 to provide a more compact and readily serviceable arrangement, but it may extend from an upper or other surface of the hub 412.

The system 400 includes an excitation input assembly 440 with a pair of actuators 444, 446 mounted to the base frame 442 and placed in abutting contact with sidewalls 418, 419 of fin 416. For example, fifty-kip linear actuators may be used to input excitation or displacing forces at a desired frequency to cause the hub 412 to pivot/oscillate 413 and shake the base 406 to cause resonant or other oscillation 405 in the vertical direction (e.g., the blade 404 oscillates generally in the flapwise direction in the illustrated system 400). Again, the actuators 444, 446 may be controlled with a controller or control system (as shown in FIG. 1, for example) to adjust the amount of displacement/stroke 445, 447 and/or the speed/frequency of the excitation 413. In some embodiments, a single actuator may be used in the place of the two actuators 444, 446 (e.g., to push and/or pull on the fin 416 and/or on one of the sidewalls 418, 419). Note, the fin 416 may also be thought of as replacing the drive or input frame of FIG. 2 allowing relocation of the actuator(s) and provides a leverage arm for inputting forcing functions. The length or height of the fin 416 is chosen to provide a desired amount of leverage to the actuators 444, 446 to allow them to pivot 413 the hub 412 about pins/shafts 420 on bearing/bearing surface 424. As with other embodiments, dual-axis fatigue testing may be performed by adding or providing additional actuators, e.g., resonant actuators on the blade span to provide edgewise (or second direction) excitation concurrently with operation of actuators 444, 446.

Exemplary embodiments of system 400 enable the ability to test two blades at once, and, hence, the system 400 may be considered a double-sided MOFO design (or DMOFO design) may use a motor, hydraulic cylinders, or other actuators to create the oscillatory motion shown in FIG. 4 and resonate one or two blades at the same time in a single direction (e.g., edgewise, flapwise, or other direction). Dual-axis (e.g., flapwise and edgewise) excitation may also be performed, e.g., by adding a horizontal degree of freedom to the DMOFO design 400 by placing an actuator or excitation device on top of a turntable bearing or by using other bearing arrangements. In addition, the blade platform 410 may be used as a static test stand or as a static foundation by anchoring the counterweight to the ground/platform 402. As shown, each blade 404 is mounted to the rotating or rotatable hub 412. If desired, only one blade may be tested at a time as shown with a blade replaced by counterweights 414. The frame 442 and support assembly 410 is semi-mobile as it is a self-contained structure that is fastened to a foundation 402.

The DMOFO system 400 provides a number of desirable features and advantages. Two blades may be tested simultaneously on the same stand with a single set of hydraulics or other loading/actuating systems, which increases the throughput of a testing facility (e.g., doubles throughput). The bearing location is in-line with the pitch axis of the blade 404. Corresponding motion more accurately simulates the motion of blades in the field and reduces the moment of inertia of the system 400, thereby using less hydraulic or input excitation forces. In addition, the hub 412 supporting the pins/shafts 420 and bearings 424 may be less expensive to produce compared with existing test stands while providing increased structural efficiency. An actuator (e.g., hydraulics, electric drive, or the like) may be positioned underneath the bearings 424 and hub 412, which allows the actuators 444, 446 to be placed in a low, horizontal position that is easier to install and inspect than a vertical actuator. Further, the position of these actuators 444, 446 facilitates use of multiple, smaller actuators by placing them on either side of the lever arm or fin 416, which reduces the size of the actuators thus reducing the need for costly, large, custom actuators used in prior testing systems to fatigue test large blades (e.g., up to 40 meter or larger blades).

The anchoring system (e.g., base frame 442) is more compact and potentially less expensive than a very long truss-style frame (e.g., frame 222 of system 200). A ballast system (not shown) may be used for static testing, and the ballast system may be dual-purpose in that it may be used to rotationally strain the test stand for static testing, thereby reducing overall system cost. The mean angle of the test stand 442 can be easily changed for static and fatigue testing, thereby reducing the height of the test stand hub 412 and potentially resulting in a less expensive, shorter building of lower height. Again, the DMOFO uses base excitation to oscillate 405 the blade 404 (or blades 404). One set of hydraulic cylinders are located on a stationary reference frame 442, thereby reducing the installation time and allowing the system 400 to be test a wide range of blade lengths without installing specialized equipment for each size range of blades.

Figure 5:
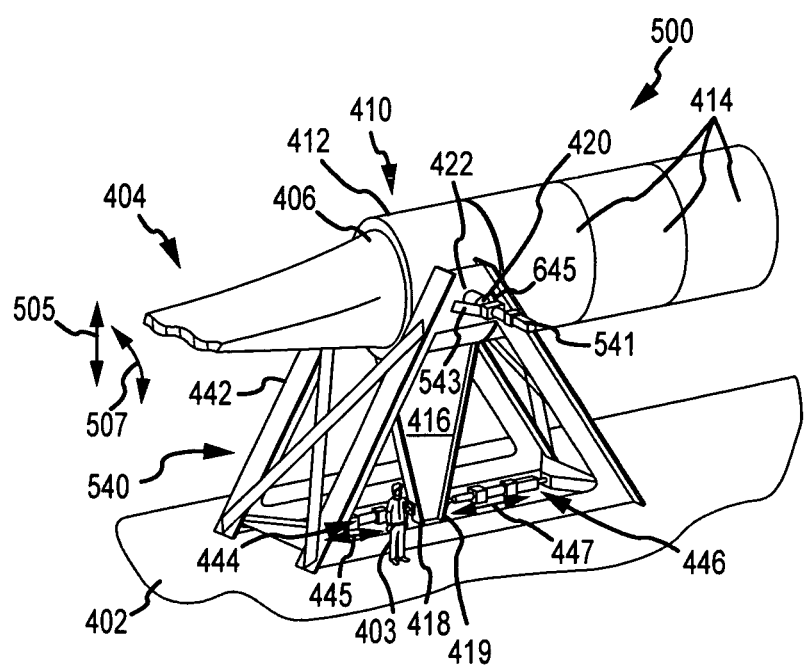
FIG. 5 illustrates an isometric view of the testing system of FIG. 4 adapted for dual-axis fatigue testing (e.g., for imparting base excitation in at least two directions).
Figure 6:
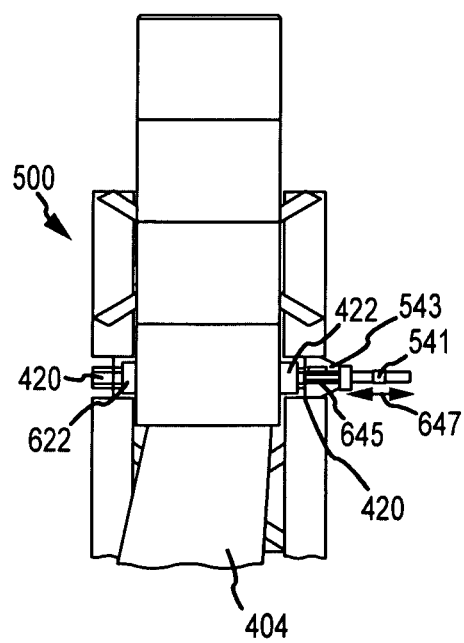
FIG. 6 is a top view of the testing system of FIG. 5 showing details of an actuator assembly for excitation of a blade base in a second direction (such as in an edgewise direction).

In many applications, it is desirable to perform dual-axis or multi-axis fatigue testing of wind rotor blades rather than sequentially testing in a single direction or degree of freedom. FIGS. 5 and 6 illustrate a multi-degree of freedom blade testing system 500 that utilizes the concept of base excitation. In contrast to the systems 200 and 400, though, the base excitation is in two or more directions of degrees of freedom so as to enable concurrent fatigue testing in multiple directions (e.g., oscillating a blade in the flapwise, edgewise, and/or pitch direction in a single testing period). The excitation may be resonant (e.g., excitation input at or near resonant frequencies of a blade in an edge direction and the flap direction) or be forced excitation at a different frequency or speed.

FIG. 5 illustrates blade-testing system 500 adapted for testing with two degrees of freedom testing of one or two blades 404 (e.g., dual-axis, base-excitation, blade testing). The system 500 generally builds upon the system 400 of FIG. 4 with modifications/additions to provide excitation or forcing in a second direction or degree of freedom. The system 400 is adapted for testing in a single direction such as the flapwise direction of a blade (as shown in FIG. 4). In contrast, the system 500 is adapted for fatigue testing in two directions that are transverse to each other and that may be substantially orthogonal (e.g., seventy to one hundred and ten degrees from each other) such as resonating a blade 404 in a first, generally vertical direction 505 and a second, generally horizontal direction. In this manner, for example, a blade 404 may be excited or shaken at its base 406, which is attached to a hub 412 in a blade support assembly 410, to concurrently (e.g., within a single test period but, in some cases, at offset phases) oscillate in a flapwise direction 505 and in an edgewise direction 507.

As shown, the excitation input assembly 540 of system 500 includes actuators 444, 446 for applying forces as shown at 445, 447 to lever arm or fin 416 to pivot 413 the hub 412 about pins/shafts 420, and this causes blade base 406 to be moved or oscillated to cause the blade 404 to oscillate in a first direction 505 (e.g., generally vertical or in the flapwise direction with the blade mounting as shown in FIGS. 5 and 6). Additionally, the system 500 includes an additional actuator(s) 541 to provide dual or second axis testing of the blade 404. The actuator 541 may be a linear actuator that is attached to the base frame 442 proximate to the pins/shafts 420 and collar 422 (with a second pin/shaft 420 supported by collar 622, which includes a bearing(s) to facilitate sliding and rotating motion of pin/shaft 420).

During operation of the actuator 541, a force transmission element or shaft 645 of the actuator 541 abuts or contacts the shaft or pin 420, which is rigidly connected to hub 420. The force transmission element 645 may apply a force or cause linear displacement 647 of the shaft/pin 420 and, therefore, the hub 420 in a direction that is transverse (and, in some cases, substantially orthogonal) to the movements 413 of the hub 412 in response to inputs 445, 447 of actuators 444, 446. The input 647 of actuator 541 may be controlled to provide resonant or forced excitation 507 of the blade 404 in a second degree of freedom or direction (e.g., in an edgewise direction) via excitation of the blade base or root 406. The oscillating 505, 507 may be concurrent to provide dual-axis fatigue testing of the blade 404 (and, in some cases, a second blade replacing weights 414) using base excitation. The hub 412 in system 500 is mounted on base frame 442 for two degrees of freedom movement in that it can pivot 413 and also slide horizontally in response to linear input 647, which allows the blade 404 to be excited at its base in two directions or degrees of freedom The system 500 may be considered a universal MOFO design. Like the DMOFO system 400, the UMOFO system 500 may be used as a single-axis fatigue test stand, a static test stand, and/or as a rigid foundation by anchoring the counterweight 414 or lever arm 416 to a fixed reference frame. The UMOFO system 500 may also use base excitation for dual-axis fatigue testing as shown in FIGS. 5 and 6. The UMOFO system 500 uses base excitation, thereby avoiding the use, and associated challenges associated with use of, high pressure hydraulic systems and large moving masses placed on flexible, fragile blades 404. In the UMOFO system 500, the hydraulic cylinders or other actuators may be located or mounted on the stationary reference frame 442, thereby increasing facility throughput of blades by reducing the system complexity, installation and tuning time, and facilitating testing of a wide range of blade lengths without installing different resonant excitation testing equipment for each range of blades 404.

The UMOFO system 500 is adapted to allow translational motion 507 of the blade 404 in the horizontal (or generally horizontal) direction and rotational motion 505 of the blade 404 in the vertical (or generally vertical) direction. It may be desirable, though, to provide differing arrangements of a UMOFO system, such as to address concerns with bearing service life due to pivoting and sliding of the hub 412 (or shaking the base 406 of blade 404) that will generate significantly high forces (due to the weight of the system components such as blade 404 and weights 414 as well as of hub 412) causing wear of bearings and bearing/contact surface in system 500 (as well as in systems 200, 400).

For example, another dual-axis, base excitation testing system 700 is shown for use in fatigue testing a wind turbine blade 704. The UMOFO system 700 shows a bearing arrangement that differs from that shown in system 500 for handling forces created by base excitation in two or more directions, but the UMOFO system 700 is also useful for oscillating a base 706 of a blade 704 to generate oscillation in two directions 705, 707 (e.g., flapwise and edgewise directions). As shown, the system 700 includes a blade support assembly 710 with a hub 712 for receiving and supporting a base or root 706 of a test article 704, and counterweights 716 are attached to the other side of the hub 712 to counterbalance the blade 704. The hub 712 is mounted onto a test platform or foundation 702 via pedestal 714. A collar 721 extends from the hub 712 and a shaft extends within the collar 721 and is received supported within the pedestal 714. A bearing or bearing surface 726 is provided about or in contact with the shaft 724 to facilitate rotate or pivoting 748 if the hub 712 during operation of the system 700. The bearing 726 may be a thrust or other type of bearing to support rotary motion of shaft 724. The collar 721 may also include bearings 723 such as bearing pucks to support an amount of vertical displacement or sliding 752 of the shaft 724, which causes excitation of base 706 and oscillation 705 of blade 704.

The system 700 further includes an excitation input assembly 740 that includes a lever or torque arm (or input/drive frame) 742 that is affixed to one or more of the counterweights 716. The assembly 740 also includes an actuator 746 that is mounted on a support frame 744 (which is attached to platform 702), with the actuator 746 acting upon the torque arm 742 to apply a linear forcing function 747 (e.g., a linear displacement of the arm 742 at a particular input frequency). This input excitation is transmitted by the arm or frame 742 to the counterweights 716 and interconnected hub 712 causing the hub 712 to rotate or oscillate 748 a small amount about a vertical axis of the shaft 724. To provide dual-axis excitation, a second actuator 750 is mounted on the hub 712 to be in abutting contact with the shaft (or a second shaft/pin) 724 extending from hub 712. Displacements or forcing functions 752 are applied by the actuator 750 on the hub 712 via the shaft 724, and a collar 720 is used to support one or more bearings (e.g., bearing pucks) 722 to support sliding motion. The use of puck bearings 722, 723 are easily replaceable and allow the shaft 724 to be a large diameter. The displacements 752 are in a direction that differs from the direction of the first displacement 748, and the two directions may be in transverse or even orthogonal planes (e.g., horizontal and vertical planes). During operation of the system 700, the base 706 is shaken or oscillated in two directions causing concurrent oscillation of the blade 704 as shown at 705, 707.

The above examples describe translating test systems that oscillate blades in two axes (e.g., dual-axis testing) by rotating the test stand or reaction structure supporting the blade base in one direction and translating the test stand or reaction structure in a transverse direction. The translating motion may wear out the bearings relatively rapidly during fatigue testing because only a small portion of the bearing supports the translating or sliding motion. In addition, the bearing life in the translating test system may further be reduced because the bearings are in the load path of the oscillating horizontal fatigue loads and the horizontal static testing loads. Additionally, some translating test systems may not have mechanical leverage in the translating direction that use relatively large and expensive linear actuators.

With these issues in mind, an additional embodiment of a UMOFO test system 800 is shown in FIGS. 8-10. The system 800 is a rotation-based fatigue testing system for wind turbine blades 804, with one being tested and counterbalanced with weights 813 while other uses may test two blades concurrently with a blade replacing the weights 813. The system 800 is adapted to extend the bearing life and reduce actuator costs. The rotational UMOFO system 800 replaces the translational motion with a rotational motion that is conducive to longer bearing life due to the elimination of the translational motions and by isolating the main bearings from the oscillating and static test loads. In addition, exemplary embodiments such as system 800 use a long lever arm that parallels the blade axis. The long lever arm (e.g., see frame with base and upper arms/members 843, 845) provides mechanical advantage for horizontal and vertical testing (e.g., two direction excitation) reducing the actuator capacities. The long lever arm can extend to the rear of the blade support assembly or to the front as shown in FIGS. 8 and 9. Extending the arm to the front along the blade 804 reduces the radial loads on both sets of rotary bearings and the foundation during static and fatigue testing, and results in a shorter overall length of the UMOFO system 800.

Referring to FIG. 8, the rotational UMOFO system 800 includes a blade support assembly 810 mounted upon a test platform or foundation 802. A test article or blade 804 is attached at its base 806 to the support assembly 810 such that its tip 808 is supported in a cantilevered manner relative to the assembly 810. The system 800 includes an excitation input assembly 840 that is adapted to rotate the support assembly 840 and base 806 in two degrees of freedom or two directions such as vertically (or cause the support 810 to rock back and forth) and horizontally (or cause the assembly 810 to pivot about its vertical central axis).

Rotation about two transverse axes is achieved as shown in FIGS. 9 and 10 with system 800. In FIG. 9, additional details of the blade support assembly 810 are provided with the assembly 810 including a hub 812 onto which the blade base 806 is mounted as well as the counterweights 813. The hub 812 is affixed to a support member 814 (e.g., a cylindrical support element or the like), which is pivotally mounted via rotational bearing 820 to the testing platform or foundation 802 such that the support member 814 may rotate 824 about its vertical or central axis (not shown). A stub 816 may extend up from the bearing surface 820 and the support member 804 may be positioned upon this pivotal stub 816. The stub 816 may include horizontal supports or pins/shafts 818 extending out from each side and through the walls of support member 814. A pair of rotational bearings 822 may be provided at the area of mating between the pins/shafts 818 and the support member 814 such that the support member or reaction structure 814 may pivot in a second direction (e.g., in a plane that is transverse to the pivoting or rotation 824 such as a generally vertical plane whereas rotation 824 is in a generally horizontal plane). By causing these two rotational movements of the support member 814 and attached hub 812 the base 806 of blade 804 is caused to oscillate in two directions (e.g., in flapwise and edgewise directions or the like).

The system 800 also includes the excitation input assembly 840 with includes an input or drive member or frame formed (in this example) with a base arm 843 and an upper arm 845 that are attached at a first end to the support member 814 (e.g., at a contact surface or face of member 814 similar to surface 212 of structure 211 in FIG. 2) and are connected to each other at a second end distal to the support member 814. Pivoting of the support member 814 about two axes is achieved by positioning the base member 843 upon a mobile trolley 1000 that rides upon wheels, casters, or bearings 1034, 1036 on platform 802 as shown at 1032. The trolley 1000 supports a first actuator 1020 that is arranged to act as a vertical actuator and applies an excitation or forcing function to the base member 843 and upper member 845, whereby the tips 842, 844 of the members 843, 845 are moved up and down in a vertical channel 1014 between sidewalls or vertical members 1012 of trolley 1000. This vertical movement 1021 causes the support member 814 to pivot about shafts/pins 818 and oscillates the base 806 of blade in the vertical direction.

To provide dual-axis oscillation, a second actuator 1030 is mounted upon the platform 802 and placed in contact with the trolley 1000 to cause the trolley to move along a small arc or curved path on platform 802 as shown at 1032. This movement in the horizontal plane (or plane of the surface of platform 802) is translated via base member 843 and upper member 845 of the excitation input assembly 840 to the support member 814, which causes the support member 814 to rotate or pivot about its vertical axis on the bearing 820. The hub 812 moves with the support member 814 in this second direction, which shakes or excites the base 806 causing oscillation of the blade 804 in a second direction (e.g., in an edgewise or other direction).

In this manner, the rotational UMOFO system 800 implements a trolley 1000 to guide the arm assembly (e.g., members 843, 845) simultaneously in the vertical and horizontal directions. In alternative embodiments, two actuators may be implemented without a trolley to provide this rotational movement in two directions or to provide movement of the blade support in two degrees of freedom. In such an arrangement, two force members may be oriented orthogonally or at other angles to control the motion of the arm assembly (e.g., members 843, 845). Such a configuration reduces part count by eliminating the need for the trolley and its components, but it may use a more complex control algorithm because the actuator displacements are coupled, using motion in each for a single vertical or horizontal motion.

Figure 7:
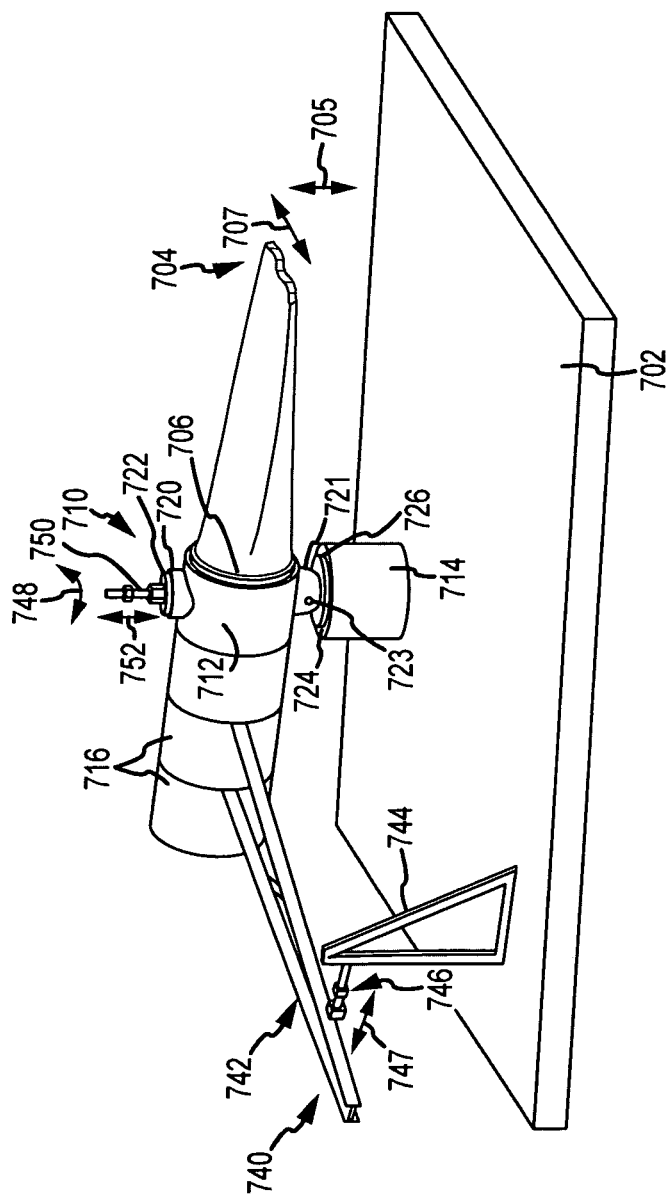
FIG. 7 is an isometric view of another test system adapted for fatigue testing of a wind turbine blade in two directions (e.g., adapted for dual-axis excitation of a support assembly used to support a base or root of a blade or other elongate test article).

While a number of exemplary aspects and embodiments are discussed above, those of skill in the art will recognize certain modifications, permutations, additions, and sub-combinations thereof It is therefore intended that the following appended claims and claims hereafter introduced are interpreted to include modifications, permutations, additions, and sub-combinations to the exemplary aspects and embodiments discussed above as are within their true spirit and scope. For example, the system 700 of FIG. 7 may be modified for use as a single axis or direction testing system. In such an embodiment, the actuator 750, collar 720, and bearing 722 (as well as a thrust bearing in collar 722 if provided for rotary motion). A single slew or similar bearing may be provided as bearing 726 at the base of the blade support 710. The blade 704 may be loaded for fatigue testing in a variety of directions such as either a flapwise direction (e.g., making the system 700 a sideways MOFO) or edgewise with motion 707 occurring in the oscillating blade 704.

Additionally, the testing systems may be augmented with additional actuators linked to a test article to excite a blade in an additional direction (e.g., the systems described may be used for first and/or second directions and another actuator may be provided to achieve dual-axis or multi-axis oscillation of a blade). A number of oscillating systems may be used to provide the concurrent or dual-axis excitation of the test article or wind turbine blade (with "blade" being used from hereon for ease of explanation). Generally, the oscillating systems may include one or more actuators or other devices for imparting both the flap and the edge forcing functions in a controlled manner (e.g., at the edge and flap resonant frequencies of the test system).

For example, the additional actuators or oscillating systems may provide one or more flapwise actuators and one or more edgewise actuators that are attached at the same or differing locations or stations along the length of the blade and are operated by a control system with displacement signals provided at natural frequencies (e.g., constant amplitude sinusoidal displacement signals at the same or more typically at differing amplitudes to simulate in-use or a predefined loading condition). These actuators may be provided, but are not limited to, via an augmented Universal Resonant Excitation (UREX) system such as by using the two flapwise actuators of a typical UREX system and adding an edgewise actuator or edge mounted UREX to provide the edge forcing function. Other hardware embodiments may include multiple flapwise and edgewise actuators at multiple distinct spanwise blade stations. In other implementations, the blade is excited in the flapwise direction using a Blade Resonance Excitation (BREX) system, which is described in U.S. Patent Application Pub. No. 2006/0037402, which is incorporated herein by reference in its entirety. In such an implementation, the blade may be concurrently excited in the edgewise direction using an Edge Resonance Excitation (EREX) system that may be BREX system applied to a blade to provide a forcing function in edgewise direction with or without modification. In other applications, the oscillating system utilizes a single actuator, such as a BREX-type system, to provide both forcing functions. This may be achieved, for example, by providing a displacement signal at an oscillating frequency composed of two distinct frequencies, e.g., a flap carrier signal with a riding edge frequency or the like.

The invention claimed is:

1. An apparatus for fatigue testing elongate test articles including wind turbine blades, comprising:
   a testing platform;
   a blade support retaining a base of an elongate test article, the blade support being pivotally mounted on the testing platform to allow the blade support to pivot or translate in one or more directions with at least two degrees of freedom of motion relative to the testing platform; and
   an excitation input assembly interconnected with the blade support comprising first and second actuators concurrently applying excitation forces to the blade support in first and second directions at first and second frequencies, respectively;

wherein the first direction is transverse to the second direction and wherein the test article is oscillated in two, transverse directions.

2. The apparatus of claim 1, wherein the test article comprises a wind turbine blade and wherein the two, transverse directions are flapwise and edgewise directions of the wind turbine blade and wherein the first and second frequencies are selected based on resonant frequencies of the test article in the flapwise and edgewise directions.

3. The apparatus of claim 1, wherein the blade support comprises a hub pivotally mounted to the testing platform and receiving the base of the test article, wherein the excitation input assembly comprises a leverage arm extending from the hub, and further wherein the first actuator applies forces to the leverage arm with the first direction being substantially parallel to a longitudinal axis of the test article.

4. The apparatus of claim 3, wherein the hub is mounted to the testing platform for translational movement in the second direction and wherein the second actuator comprises a linear actuator applying forces to the blade support proximate to a pivot axis of the hub and in the second direction.

5. The apparatus of claim 1, wherein the blade support comprises a hub mounted to the testing platform to be rotatable about two transverse axes and adapted for supporting the base of the test article, wherein the excitation input assembly comprises a leverage arm extending from the blade support, the first and second actuators applying the first and second direction forces to the leverage arm at a location spaced apart from the hub with the leverage arm transmitting the applied forces to the blade support, whereby the hub is rotated about the two transverse axes to cause the test article to oscillate in two, transverse directions.

6. The apparatus of claim 5, wherein the excitation input assembly further comprises a trolley with a channel for receiving the leverage arm, supporting the first actuator, and being adapted for rolling or sliding on an upper surface of the testing platform and wherein the second actuator is mounted to the upper surface of the testing platform and in abutting contact with the trolley or the leverage arm to apply the forces in the second direction.

7. The apparatus of claim 1, wherein the two degrees of motion comprise rotation about a vertical axis passing through a hub supporting the base of the test article and vertical displacement of the hub relative to the testing platform.

8. The apparatus of claim 7, wherein the excitation input assembly comprises a leverage arm linked to the hub and the first actuator for applying forces in the first direction via the leverage arm to rotate the hub about the vertical axis of the hub and further comprises a linear actuator applying forces in the second direction proximate to the vertical axis of the hub to cause the vertical displacement of the hub.

9. A dual-axis testing system for fatigue testing wind turbine blades, comprising:
a blade support assembly comprising a hub adapted for retaining a base of a wind turbine blade, wherein the blade support assembly includes a support member extending from the hub, wherein the support member is pivotally mounted to a stub element to allow the support member to pivot or translate in one or more directions for rotation about a first axis, and wherein the stub element is supported by a rotational bearing for rotation about a second axis;
a first actuator operable to apply first excitation forces on the blade support assembly at a first frequency in a first direction; and
a second actuator operable to apply second excitation forces on the blade support assembly at a second frequency in a second direction generally orthogonal to the first direction, wherein the hub oscillates in more than one direction based on the applied first and second excitation forces.

10. The system of claim 9, further comprising a leverage arm assembly extending outward from the support member, wherein the first and second actuators apply the excitation forces to the leverage arm assembly at one or more locations spaced apart from the support member.

11. The system of claim 10, further comprising a trolley supporting the first actuator, wherein the second actuator is mounted to a testing foundation and positioned in abutting contact with the trolley, the trolley being adapted for rolling on a surface of the testing foundation.

12. The system of claim 9, wherein the hub oscillation comprises rotation about a first axis, the first axis passing through the hub, and wherein the hub oscillation relative to a second axis in response to the applied second excitation forces comprises translational linear motion along the second axis.

13. The system of claim 12, further comprising a leverage arm extending vertically downward from the hub and wherein the first actuator applies the second excitation forces to the leverage arm.

14. The system of claim 12, wherein the second actuator comprises a linear actuator acting on a shaft extending outward from the hub, the shaft being pivotally mounted via a bearing to a support frame.

15. A wind turbine blade fatigue testing apparatus, comprising:
a reaction structure comprising an adapter for receiving a base of a wind turbine blade, wherein the reaction structure is pivotally mounted to a support adapted for mounting to a testing platform to allow the reaction structure to pivot or translate in one or more directions;
a lever arm assembly extending outward from a surface of the reaction structure; and
an actuator linked to the lever arm assembly, wherein the actuator is operable to displace the lever arm assembly at a predefined stroke distance at a test frequency, whereby the lever arm assembly applies cyclic excitation forces to the surface of the reaction structure causing the reaction structure to pivot relative to the support.

16. The apparatus of claim 15, further comprising a linear actuator applying a second set of cyclic excitation forces to the reaction structure in a direction transverse to a direction of the pivoting of the support.

17. The apparatus of claim 15 wherein the support is linked to a rotational bearing assembly such that the support is rotatable about an axis transverse to a pivotal axis of the support.

18. The apparatus of claim 15, wherein the reaction structure further comprises an additional adapter positioned opposite the base adapter, the additional adapter configured for receiving a base of an additional wind turbine blade, whereby the apparatus is operable to concurrently fatigue test two wind turbine blades.

19. The apparatus of claim 15, further comprising a blade-mounted actuator spaced apart from the reaction structure, wherein the blade-mounted actuator provides excitation forces in a second direction differing from the actuator and wherein the blade-mounted actuator comprises a Universal Resonant Excitation (UREX) system or a Blade Resonance Excitation (BREX) system.

* * * * *